United States Patent [19]

Uchida et al.

[11] Patent Number: 5,587,444
[45] Date of Patent: Dec. 24, 1996

[54] COPOLYMER, A PROCESS FOR PRODUCING THE SAME AND AN ELECTROLUMINESCENT ELEMENT USING THE SAME

[75] Inventors: Manabu Uchida; Takenori Izumizawa; Kenji Furukawa, all of Kanagawa-ken, Japan

[73] Assignee: Chisso Corporation, Osaka-fu, Japan

[21] Appl. No.: 364,894

[22] Filed: Dec. 27, 1994

[30] Foreign Application Priority Data

Dec. 27, 1993 [JP] Japan ................. 5-354192

[51] Int. Cl.$^6$ ................. H01J 1/62
[52] U.S. Cl. ................. 526/247; 526/248; 526/259; 526/266; 526/268; 428/690; 428/691
[58] Field of Search ................. 428/690, 691; 526/266, 268, 259, 248

[56] References Cited

U.S. PATENT DOCUMENTS 3,316,087  4/1967  Munder et al. ............ 428/690

FOREIGN PATENT DOCUMENTS 4-212286  8/1992  Japan .
4-359989  12/1992  Japan .

OTHER PUBLICATIONS

Freloves et al, "Coumarin Derivatives in Preparing Fluorescence Lagend Polyacrylamide", (1980) CA#93:27152.
Nishikitani et al., "Organic Electroluminescent devices" (1992), CA#119:82662.

Uchida et al., "Preparation Of Coumarin Derivatives For Electroluminescent Devices", Abstract, Database Chemabs Chemical Abstracts Service, Columbus, Ohio, Oct. 25, 1994.
Kido et al., "White Light–Emitting Organic Electroluminescent Devices Using The Poly(N–Vinylcarbazole) Emitter Layer Doped With Three Fluorescent Dyes", Applied Physics Letters, vol. 64, No. 7, Feb. 1994–Nov. 23, 1993, New York, pp. 815–817.
Nippon Oil KK, Abstract, Database WPI, Section Ch, Week 9304, Derwent Publications Ltd., London, GB; A26, AN 93–032229, Dec. 14, 1992.
Kido et al., "Bright Blue Electroluminescence From Poly(N–Vinylcarbazole)", Applied Physics Letters, vol. 63, No. 8, Nov. 8, 1993, New York, pp. 2627–2629.

*Primary Examiner*—Elizabeth C. Weimar
*Assistant Examiner*—Patrick R. Delaney
*Attorney, Agent, or Firm*—Wenderoth, Lind & Ponack

[57] ABSTRACT

A novel copolymer affording a highly efficient electroluminescent element by the use of which the movement of electric charge occurs very efficiently and a full color luminescence is possible, a process for producing the same and an electroluminescent element, are provided, which copolymer is prepared by copolymerizing N-vinylcarbazole as an electron-transporting compound with a specified cumarin derivative as a luminescent compound; which process comprises copolymerizing a specified quantity of a specified cumarin derivative with a specified quantity of N-vinylcarbazole in the presence of a polymerization initiator or a catalyst; and which electroluminescent element is prepared by using a thin film obtained from the copolymer.

2 Claims, 4 Drawing Sheets

COPOLYMER, A PROCESS FOR PRODUCING THE SAME AND AN ELECTROLUMINESCENT ELEMENT USING THE SAME

BACKGROUND OF THE INVENTION

1. Field of the Invention

This invention relates to a novel copolymer consisting of a cumarin derivative and N-vinylcarbazole, a process for producing the same, and an electroluminescent (hereinafter abbreviated to EL) element using the copolymer.

2. Description of the Related Art

Noticing the high fluorescent efficiency of organic compounds, research on elements utilizing the EL properties of organic compounds has been carried out for a long time. For example, W. Helfrish and Dresmer Williams obtained a blue color fluorescence using anthracene crystals (Journal of Chemical Physics, Vol. 44, p. 2902, 1966, and J. Chem. Phys., 44, 2902 (1966)). Further, C. W. Tang and S. A. Vanslyke obtained a green color fluorescence using an oxine complex (Applied Physics, Lett., 51 (12), 21 (1987)).

However, these have not been provided with sufficient conditions for practical utility. For example, there have been raised such problems that, in the former case, the driving voltage is high, and in the latter case, as the luminescent layer has no positive hole-injection capability, a laminate structure containing a positive hole-injecting layer is required, and further, it is difficult to obtain a luminescence having a wavelength shorter than the luminescent wavelength of 8-hydroxy-quinoline aluminum complex having a capability of electron-injecting capability.

On the other hand, Japanese patent application laid-open No. Hei 4-212286 discloses an organic EL element having a mixture of a compound having a positive hole-injecting capability, a fluorescent substance and a compound having an electron-injecting capability. However, this element, too, has been unsatisfactory in the aspect of luminescent efficiency. Further, Japanese patent application laid-open No. Hei 4-359989 discloses a cumarin polymer. However, the cumarin homopolymer has a drawback that the concentration extinction is notable. Thus, the luminescent efficiency is inferior.

In order to obtain a high luminescent efficiency in the organic EL element, it is necessary to efficiently take out the positive hole and electron from the electrode, efficiently transport them as far as the luminescent center and further, efficiently inject them into the luminescent center. As one of materials for transporting the positive hole and injecting it into the luminescent center as above (positive hole-transporting material), poly N-vinylcarbazole (hereinafter abbreviated to PVCz) has been known. An example wherein this PVCz was used as a positive hole-transporting layer, has been disclosed in Japanese patent application laid-open No. Hei 3-137186. However, a potential barrier between the layer and the luminescent layer has constituted a factor of lowering the efficiency. Further, the above Japanese patent application laid-open No. Hei 4-212286 discloses an example wherein a fluorescent pigment is mixed with PVCz. When the positive hole or electron moves from one molecule to another molecule, the shorter the distance between the respective molecules, the more efficiently the hole or electron moves. In other words, it is preferred that the positive hole-transporting material is close to the luminescent layer. Additionally, as compared with the case where the positive hole-transporting material is mixed with the luminescent material, a case where they are chemically bonded to each other is particularly preferred.

SUMMARY OF THE INVENTION

In order to solve these problems and thereby find an organic EL element having a high luminescent efficiency, we have made extensive research. As a result, we have found that an organic EL element using a novel compound obtained by copolymerizing a cumarin derivative with N-vinylcarbazole has a high efficiency. Thus, we have completed the present invention.

The present invention has the following aspects of 1) to 6).

1) A copolymer consisting of repetition units expressed by the formula (1) and repetition units expressed by the formula (2), the content of the repetition units (1) in the total repetition units being 0.01 to 50% by mol, and the weight average molecular weight calculated in terms of polystyrene (hereinafter merely abbreviated to weight average molecular weight) measured according to gel permeation chromatography being 1,000 to 1,000,000:

in the formula (1), $R_1$ to $R_5$ each independently being chosen from the groups of hydrogen, fluorine, alkyl group, alkoxy group, dialkylamino group, alkanoyloxy group, alkyloxycarbonyl group, aryl group, cyano group, alkanoyl group or trifluoromethyl group; X representing O or NY (wherein Y represents hydrogen, alkyl group or aryl group); n representing 0, 1 or 2; and $R_6$ representing hydrogen or methyl group.

2) A copolymer according to item 1), wherein the repetition units of the formula (1) and the formula (2) are arranged randomly.

3) A process for producing a copolymer, which comprises reacting a mixture of one or more cumarin derivatives expressed by the formula (3)

whose total quantity is 0.01 to 50% by mol, with 99.99 to 50% by mol of N-vinylcarbazole, in the presence of a polymerization initiator or a catalyst.

4) An electroluminescent element using a thin film containing a copolymer consisting of repetition units expressed by the formula (1) and the formula (2) set forth in item 1), the content of the repetition units expressed by the formula (1) in the total repetition units being 0.01 to 50% by mol, and having a weight average molecular weight of 1,000 to 1,000,000.

5) An electroluminescent element according to item 4), arranged in the order of an anode/a thin film containing said copolymer/a cathode.

6) An electroluminescent element according to item 4), arranged in the order of an anode/a thin film containing said copolymer/a thin film consisting of an electron-transporting material/a cathode.

7) An electroluminescent element according to item 4), arranged in the order of an anode/a thin film containing said copolymer and an electron-transporting material/a cathode.

DETAILED DESCRIPTION OF PREFERRED EMBODIMENTS

The present invention will be described in more detail.

The above novel copolymer of the present invention can be produced according to the production process described below. Namely, the copolymer is obtained by copolymerizing N-vinylcarbazole with a cumarin derivative expressed by the formula (3) in the presence of an initiator or a catalyst. The polymerization process has no particular limitation as far as both the monomers are copolymerized. As examples of the polymerization process, radical polymerization, cationic polymerization, etc. are mentioned. As initiators used for radical polymerization, known initiators such as azo compounds such as azobisisobutyronitrile (hereinafter abbreviated to AIBN), peroxides such as benzoyl peroxide, dithiocarbamates such as tetraethylthiuram disulfide, etc. are mentioned. As the catalyst used for cationic polymerization, known compounds such as Lewis acid compounds such as trifluoroborate or tin tetrachloride, inorganic acid compounds such as sulfuric acid or hydrochloric acid, cationic exchange resins, etc. are mentioned.

As concrete examples of cumarin derivative monomers used for the preparation of the copolymer of the present invention, compounds expressed by the formulas (4) to (62) are mentioned:

(4)

(5)

(6)

(7)

(8)

(9)

(10)

(11)

(12)

(13)

(14)

-continued

Chemical structures (15) through (31) depicting coumarin derivatives with various substituents including acrylate, acrylamide, imine, and trifluoromethyl groups.

Among these compounds, those having an ethylene group between (meth)acryl group and cumarin ring are preferable, and among those, compounds expressed by the formulas (13), (15), (17), (29), (31), (33), (43), (45), (47), (57), (59) and (61) are particularly preferable.

The polymerization reaction may be carried out without using any solvent, but use of a solvent is preferable since the reaction heat can be easily removed. As concrete examples of the solvent used in the present invention, benzene, toluene, xylene, anisole, chloroform, carbon tetrachloride, N,N-dimethylformamide, N,N-dimethylacetamide, N-methyl-2-pyrrolidone, N,N-dimethylsulfoxide, petroleum ether, ligroin, hexane, heptane, cyclohexane, dioxane, etc. may be mentioned, but the solvent is not always limited to these.

As preferable embodiments of the polymerization reaction, there may be mentioned (i) a process wherein one or more cumarin derivatives expressed by the formula (3) are mixed with N-vinylcarbazole in the presence of a solvent and reaction is carried out in the presence of a polymerization initiator or a catalyst, to obtain a random copolymer; (ii) a process wherein a cumarin derivative is mixed with N-vinylcarbazole, followed by carrying out reaction for a definite period, thereafter adding another kind of cumarin and continuing the polymerization reaction, to obtain a random copolymer; (iii) a process of repeatedly carrying out the reaction process (ii); (iv) a process wherein a reaction of only either one of a cumarin derivative or N-vinylcarbazole is initially carried out for a definite period, followed by adding the other monomer and continuing polymerization reaction, to obtain a block copolymer; (v) a process wherein the above reaction conditions are intermittently or continuously varied midway during the polymerization reaction, in order to control the distribution of the molecular weight of the polymer or the composition distribution thereof, etc. The process (i) gives a random copolymer, the processes (ii) and (iv) give block copolymers, and the process (iii) gives a multiblock copolymer.

In the production process of the present invention, the polymerization temperature is 0° to 120° C., preferably 10° to 80° C., and the reaction period is 1 to 48 hours, preferably 2 to 12 hours. After completion of the reaction, the reaction liquid is mixed with a poor solvent such as methyl alcohol, ethyl alcohol, propyl alcohol, acetone, etc. to deposit the polymer, followed by filtering off and drying, for use.

The weight average molecular weight of the thus obtained copolymer of the present invention is in the range of 1,000 to 1,000,000, preferably 5,000 to 500,000, particularly preferably 10,000 to 200,000. If it is less than the lower limit, the strength of the resulting thin film is weak, while if it exceeds the upper limit, the processability of the polymer lowers. The composition ratio of the copolymer of the present invention is in the range of 0.01 to 50% by mol, preferably 0.05 to 10% by mol, in terms of the repetition units of cumarin derivative part carrying the luminescent function, based upon the total repetition units, preferably 0.05 to 10% by mol. If the ratio is less than the lower limit, the fluorescence at the cumarin derivative part is weak, while if it exceeds the upper limit, the concentration extinction occurs, the fluorescent intensity lowers and the positive hole-transporting capability lowers.

The copolymer of the present invention is a copolymer wherein the N-vinylcarbazole part (repetition units expressed by the formula (2)) having an excellent positive hole-transporting capability has been chemically bonded to the cumarin derivative part (repetition units expressed by the formula (1)) having a high luminescent efficiency. Thus, the transportation of the positive hole to the cumarin part as the luminescent center occurs very efficiently; hence a luminescence having a high efficiency has been achieved. Further, as to the copolymer of the present invention, when the structure of the cumarin part is varied, it is possible to vary the luminescent color to various ones. For example, the copolymer obtained from a monomer expressed by the formula (13) emits a blue color light, and a copolymer obtained from a monomer expressed by the formula (62) emits a red color light. Further, when the composition ratio of the cumarin derivative part is extremely small based upon that of N-vinylcarbazole part, a violet color light originated from N-vinylcarbazole part is observed to emit. Namely, it is possible for the copolymer of the present invention to emit light over the total visible region; hence it is also adequate as a component of a display for full color. Further, the copolymer of the present invention has an adequate molecular weight; hence when it is used as a coating solution, it has a superior solubility in solvents and also a superior film-formability and further has a superior adhesion onto substrates; hence it is possible to form a good coating.

The construction of the EL element using the copolymer of the present invention includes various kinds of embodiments, but basically, there is formed a construction wherein the copolymer of the present invention is placed between a pair of electrodes (an anode and a cathode), and if necessary, the positive hole-transporting layer and the electron-transporting layer may be intervened.

Further, in the element of the above construction, it is preferred that it be supported on a substrate, and the substrate has no particular limitation, but those conventionally used so far, for example those made from glass, transparent plastics, silica, etc. can be used.

The copolymer of the present invention is useful as a luminescent layer of these EL elements. This luminescent layer can be formed by making it into a thin film for example according to a known method such as deposition method, coating method, etc., and it is particularly preferred to make it into a molecule laid-up film. Herein, the molecule laid-up film refers to a thin film formed by depositing the compound from its gas phase or formed by solidifying the compound from its solution state or liquid state. Usually this molecule laid-up film can be distinguished from a thin film (molecule laid-up film) formed according to LB method. Further, the luminescent film requires no integrating agent such as resin, etc., but the layer can be formed by dissolving the compound in a solvent, followed by making the resulting solution into a thin film according to spin-coating method or the like; hence the layer is commercially profitable.

The thickness of the thus formed thin film of the luminescent layer has no particular limitation and can be adequately chosen depending upon conditions, but usually it is chosen within a range of 2 nm to 5,000 nm.

As the anode in the EL element, those which are made from electrodic substances having a large work function (40 eV or more) such as metals, alloys, electroconductive compounds or mixtures thereof are preferably used. As concrete examples of these electrodic substances, metals such as Au, and dielectric transparent materials such as CuI, ITO, $SnO_2$, $ZnO_2$, etc. are mentioned. These anodes can be prepared by forming a thin film according to subjecting these electrodic substances to deposition, spattering, etc. In the case where luminescent light is taken from the electrodes, the transmittance is preferably 10% or higher, and the sheet resistance as the electrode is preferably several hundreds $\Omega$/mm or less.

Further, the film thickness is chosen usually in the range of 10 nm to 1 μm, preferably in the range of 10 to 200 nm.

On the other hand, as the cathode, those which are made from electrodic substances having a small work function (4 eV or less), such as metals, alloys, electroconductive compounds or mixtures thereof are used. As concrete examples of such electrodic substances, Na, Na—K alloy, Mg, Li, Mg/Cu mixture, Al/$AlO_2$, indium, etc. are mentioned. The cathode can be prepared by forming a thin film according to subjecting the electrodic substances to deposition, spattering, etc. Further, the sheet resistance as the electrode is preferably several hundreds $\Omega$/mm or less, and the film thickness is chosen usually in the range of 10 nm to 1 μm, preferably in the range of 50 to 200 nm.

The construction of the EL element using the copolymer of the present invention includes various embodiments, as described above, and since the copolymer of the present invention itself has a positive hole-transporting capability, it is unnecessary to particularly provide a positive hole-transporting layer; hence this is commercially profitable. However, if necessary, the positive hole-transporting layer may be provided between the anode and the copolymer, or instead, another positive hole-transporting material may be mixed with the copolymer layer.

As the positive hole-transporting material, use can be made of a compound which can adequately transmit the positive hole to the luminescent layer in the case where the positive hole is arranged between two electrodes having an electric field imparted thereto, and is injected from the anode. For example, a compound having a positive hole mobility of $10^{-6}$ $cm^2$/V.sec. or more, at the time of impressing an electric field of $10^4$ to $10^6$ V/cm, is adequate. Such a positive hole-transporting material has no particular limitation so far as it has the above-mentioned preferable properties, and it can be optionally chosen from among those which have so far been conventionally used as a material for transporting the electric charge of positive hole in the photoconductive materials or those which have been known to be used for the positive hole-transporting layer of EL element.

Examples of the positive hole-transporting material are as follows:

triazole derivatives (disclosed in U.S. Pat. No. 3,112,197, etc.), oxadiazole derivatives (disclosed in U.S. Pat. No. 3,189,447, etc.), imidazole derivatives (disclosed in Japanese patent publication No. Sho 37-16096, etc.), polyarylalkane derivatives (disclosed in U.S. Pat. Nos. 3,615,402, 3,820,989, 3,542,544, Japanese patent publication Nos. Sho 45-555, Sho 51-10983, Japanese patent application laid-open Nos. Sho 51-93224, Sho 55-17105, Sho 56-4148, Sho 55-108667, Sho 55-156953, Sho 56-36656, etc.), pyrazoline derivatives and pyrazolone derivatives (disclosed in U.S. Pat. Nos. 3,180,729, 4,278,746, Japanese patent application laid open Nos. Sho 55-88064, Sho 55-88065, Sho 49-105537, Sho 55-51086, Sho 56-80051, Sho 56-88141, Sho 57-45545, Sho 54-112637, Sho 55-74546, etc.), phenylene diamine derivatives (disclosed in U.S. Pat. No. 3,615,404, Japanese patent publication Nos. Sho 51-10105, Sho 46-3712, Sho 46-3712, Sho 47-25336, Japanese patent application laid-open Nos. Sho 54-53435, Sho 54-110536, Sho 54-119925, etc.), arylamine derivatives (disclosed in U.S. Pat. Nos. 3,567,450, 3,180,703, 3,240,597, 3,658,520, 4,232,103, 4,175,961, 4,012,376, Japanese patent publication Nos. Sho 49-35702, Sho 39-27577, Japanese patent application laid-open Nos. Sho 55-144250, Sho 56-119132, Sho 56-22437, West German patent No. 1,110,518, etc.

amino-substituted chalcone derivatives (disclosed in U.S. Pat. No. 3,526,501, etc.), oxazole derivatives (disclosed in U.S. Pat. No. 3,257,203, etc.)

styrylanthracene derivatives (disclosed in Japanese patent application laid-open No. Sho 56-46234,etc.), fluorenone derivatives (disclosed in Japanese patent application laid-open No. Sho 54-110837, etc.), hydrazone derivatives (disclosed in U.S. Pat. No. 3,717,462, Japanese patent application laid-open Nos. Sho 54-59143, Sho 55-52063, Sho 55-52064, Sho 55-46760, Sho 55-854995, Sho 57-11350, Sho 57-148749, etc.), stilbene derivatives (disclosed in Japanese patent application laid-open Nos. Sho 61-210363, Sho 61-228451, Sho 61-14642, Sho 61-72255, Sho 62-47646, Sho 62-36674, Sho 62-10652, Sho 62-30255, Sho 60-93445, Sho 60-94462, Sho 60-174749, Sho 60-175052, etc.), etc.

These compounds can be used as the positive hole-transporting material, but the following compounds are preferably used:

porphylin compounds (disclosed in Japanese patent application laid-open No. Sho 63-295695, etc.), aromatic tertiary amine compounds and styrylamine compounds (disclosed in U.S. Pat. No. 4,127,412, Japanese patent application laid-open Nos. Sho 53-27033, Sho 54-58445, Sho 54-149634, Sho 54-64299, Sho 55-79450, Sho 55-144250, Sho 56-119132, Sho 61-295558, Sho 61-98353, Sho 63-295695, etc.), etc.

It is particularly preferable to use the aromatic tertiary amine compounds.

Representative examples of porphylin compounds are as follows:

porphylin; 5,10,15,20-tetraphenyl-21H,23H-porphylin Cu(II); 5,10,15,20-tetraphenyl-21H,23H-porphylin Zn(II); 5,10,15,20-tetraxis(pentafluorophenyl)-21H,23H-porphylin; siliconphthalocyanine oxide; aluminumphthalocyanine chloride; phthalocyanine (non-metal); dilithiumphthalocyanine; Cu tetramethylphthalocyanine, Cu phthalocyanine, Cr phthalocyanine; Zn phthalocyanine; Pb phthalocyanine; Ti phthalocyanine; Mg phthalocyanine; Cu octamethylphthalocyanine, etc.

Further, representative examples of the aromatic tertiary compounds and stylylamine compounds are as follows:

N,N,N',N'-tetraphenyl-4,4'-diaminobiphenyl; N,N'-diphenyl-N,N'-di(3-methylphenyl)-4,4'-diaminobiphenyl (TPD); 2,2'-bis(4-di-p-triaminophenyl)propane; 1,1-bis(4-di-p-tolylaminophenyl)cyclohexane; N,N,N',N'-tetra-p-tolyl-4,4'-diaminobiphenyl; 1,1-bis(4-di-p-tolylaminophenyl)-4-phenylcyclohexane; bis(4-dimethylamino-2-methylphenyl)phenylmethane; N,N'-diphenyl-N,N'-di(4-methoxyphenyl)4,4'-diaminobiphenyl; N,N'-tetraphenyl-4,4'-diaminobiphenyl ether, 4,4'-bis(diphenylamino)quadiphenyl; N,N,N-tri(p-tolyl)amine; 4-(di-p-tolylamine)-4'-[4(di-p-tolylamine)styryl]stilbene; 4-N,N-diphenylamino-(2-diphenylvinyl)benzene; 3-methoxy-4'-N,N-diphenylaminostilbene; N-phenylcarbazole; etc.

The electron-transporting layer in the EL element of the present invention consists of an electron-transporting material and has a function of transmitting an electron injected from the cathode to the luminescent layer. Such an electron-transporting material has no particular limitation, and can be optionally chosen from among so far known compounds and used.

Examples of the electron-transporting material are as follows:

nitro-substituted fluorenone derivatives expressed by the formulas (63) and (64)

(63)

(64)

thiopyranoxide derivatives expressed by the formulas (65):

(65)

diphenylquinone derivatives expressed by the formula (66):

(66)

anthraquinodimethane derivatives (disclosed in Japanese patent application laid-open Nos. Sho 57-149259, Sho 58-55450, Sho 61-225151, Sho 61-233750, Sho 63-104061, etc.) expressed by the formulas (67) and (68):

(67)

(68)

fluorenylidenemethane derivatives (disclosed in Japanese patent application laid-open Nos. Sho 60-69657, Sho 61-143764, Sho 61-148159, etc.), anthrone derivatives (disclosed in Japanese patent application Nos. Sho 61-225151, Sho 61-233750, etc.)

oxadiazole derivatives (disclosed in Japan Chemical Society, 1991, (11): 1540, Jpn. J. Appl. Phys., 27, L713 (1988), Appl. Phys. Lett., 55, 1489 (1989), etc), thiophene derivatives (Japanese patent application laid-open No. Hei 4-212286), etc.

Next, examples of suitable processes for preparing the EL element using the copolymer of the present invention will be described as regards the respective constituting elements. The preparation process of the above-mentioned EL element consisting of anode/thin film containing the copolymer/cathode will be first described. A thin film composed of a desired electrodic substance, for example a substance for anode, is firstly formed on a suitable substrate, so as to give a film thickness in the range of 1 μm or less, preferably 10 to 200 nm, according to a process such as deposition, spattering, etc., to thereby prepare an anode, followed by forming thereon a thin film containing the copolymer of the present invention to provide a luminescent layer. As the process for making the luminescent layer into a thin film, immersion-coating process, spin-coating process, casting process, deposition process, etc. are exemplified, and immersion-coating process, spin-coating process or casting process is preferable in the aspects of not breaking the copolymer of the present invention, being capable of easily obtaining a uniform film, difficultly forming pin hole, etc.

When for example the spin-coating process is employed for making the copolymer into a thin film, the copolymer is dissolved in a solvent (e.g. THF, DMF, NMP, DMSO, toluene, benzene, chloroform, etc.) and the resulting solution is coated on a substrate by means of spinner while rotating the substrate. Next, after formation of the resulting copolymer layer, a thin film consisting of a substance for cathode is formed on the layer, in a thickness of 1 μm or less, for example according to method of deposition, spattering, etc. to provide a cathode, whereby a desired EL element is obtained. In addition, in the preparation of this EL element, the preparation order may be also reversed, that is, it may be the order of the cathode, luminescent layer, anode.

Next, the preparation process of an EL element consisting of anode/thin film containing the copolymer/electron-transporting layer/cathode will be described.

An anode is firstly formed in the same manner as in the case of the above EL element, followed by forming thereon a thin film containing a copolymer under the above spin-coating conditions, next forming on the thin film, a thin film consisting of an electron-transporting material, according to deposition, etc., to provide an electron-transporting layer, and then providing thereon a cathode in the same manner as in the above EL element preparation, to obtain the desired EL element. In addition, in the preparation of this EL element, too, the preparation order may also be reversed, that is, it may be in the order of cathode/electron-injecting layer/luminescent layer/anode.

Further, a preparation process of an EL element consisting of anode/a thin film containing a copolymer and an electron-transporting material/cathode will be described. In the same manner as in the case of the above EL element, an anode is provided, followed by mixing the copolymer of the present invention with an electron-transporting material, providing a luminescent layer according to spin-coating process, and lastly providing a cathode in the same manner as above, to obtain the desired EL element. In addition, in this preparation of EL element, the preparation order may also be reversed, that is, it may be prepared in the order of cathode/luminescent layer/positive hole-injecting layer/anode.

In the case where a direct current voltage is impressed onto the thus obtained EL element, when about 5 to 40 V is impressed, it is possible to observe luminescence from transparent or translucent electrode side. Further, even when an alternating current is impressed, light is emitted. In addition, the wave form of the impressed alternating current may be optional.

Next, the luminescent mechanism of the EL element will be described referring to the case of a construction of anode/thin film containing a copolymer and an electron-transporting material/cathode, as an example. When a voltage is impressed between the electrodes, the positive hole is injected from the anode into the carbazole part of the copolymer by the electric field. This injected positive hole is transported through the carbazole part to the cumarin part.

On the other hand, the electron is injected from the cathode into the electron-transporting material by the electric field, and further transported into the cumarin part of the copolymer, where it is rebonded to the positive hole. When this rebonding is carried out, the cumarin part is excited and when it returns to the base state, the part emits light. At that time, it is preferred that the oxidation potential of the cumarin part is lower than that of the carbazole part and the reduction potential of the cumarin part is lower than that of the electron-transporting material.

As the use applications of the copolymer of the present invention, luminescent materials for fluorescent paints and lacquers, photosensitive materials for electrophotography, photoelectric materials for solar cell, etc. besides the EL element, and as the use applications of the element of the present invention, display or illumination (backlight of liquid crystal display device, fluorescent light), etc. are considered.

The present invention will be described in more detail by way of Preparation examples, Examples and Comparative example:

PREPARATION EXAMPLE 1

Preparation of
3-(2'-benzoxazolyl)-7-vinylcarbonylumbelliferone 3-(2'-benzooxazolyl)umbelliferone (323 mg) was dissloved in THF, followed by adding to the solution, pyridine (2 ml) and acrylic acid chloride (110 mg) in this order, agitating the mixture at room temperature overnight, adding a slight quantity of hydroquinone, adding water and toluene (each, 100 ml), extracting the resulting material into the organic layer, five times washing the organic layer with water (50 ml), drying over anhydrous magnesium sulfate, distilling off toluene and purifying according to silica gel column chromatography, to obtain the objective 3-(2'-benzooxazolyl)-7-vinylcarbonylumbelliferone. The structure was confirmed according to 1H-NMR (CHCl$_3$).

$^1$H-NMR (CHCl$_3$) δ=6.12 (q, 1H), 6.36 (q, 1H), 6.79(q, 1H), 7.21 (q, 1H), 7.27 (q, 1H), 7.41 (m, 2H), 7.64 (m, 1H), 7.70 (d, 1H), 7.87 (m, 1H), 8.78 (s, 1H)

PREPARATION EXAMPLE 2

Preparation of
3-(2'-benzoxazolyl)-7-(2-vinylcarbonyloxyethyl) umbelliferone

A THF solution of 2-bromoethanol (2.74 g) was added to a THF solution of 3-(2'-benzoxazolyl)umbelliferone (1.4 g) and K$_2$CO$_3$ (1.38 g), followed by refluxing the mixture for 5 hours, filtering off solids, distilling off THF, adding toluene and water (each, 50 ml), extracting into an organic layer, further twice washing with water, drying over anhydrous magnesium sulfate, concentrating, recrystallizing from ethyl acetate, and drying under reduced pressure, to obtain yellow crystals (1 g).

The crystals were dissolved in THF, followed by adding pyridine (10 ml) and acrylic acid chloride (400 mg) in this order, agitating at room temperature overnight, adding a slight quantity of hydroquinone, adding water and toluene (each, 100 ml), extracting into an organic layer, five times washing the organic layer with water (50 ml), drying over magnesium sulfate, distilling off toluene and purifying according to silica gel column chromatography, to obtain the objective cumarin monomer. The structure was confirmed according to 1H-NMR.

$^1$H-NMR (CHCl$_3$) δ=4.33 (t, 2H), 4.57 (t, 2H), 5.89 (q, 1H), 6.18 (q, 1H), 6.48 (q, 1H), 6.91 (d, 1H), 6.96 (q, 1H), 7.39 (m, 2H), 7.58 (d, 1H), 7.62 (m, 1H), 7.85 (m, 1H), 8.73 (s, 1H)

EXAMPLE 1

Figure 1:
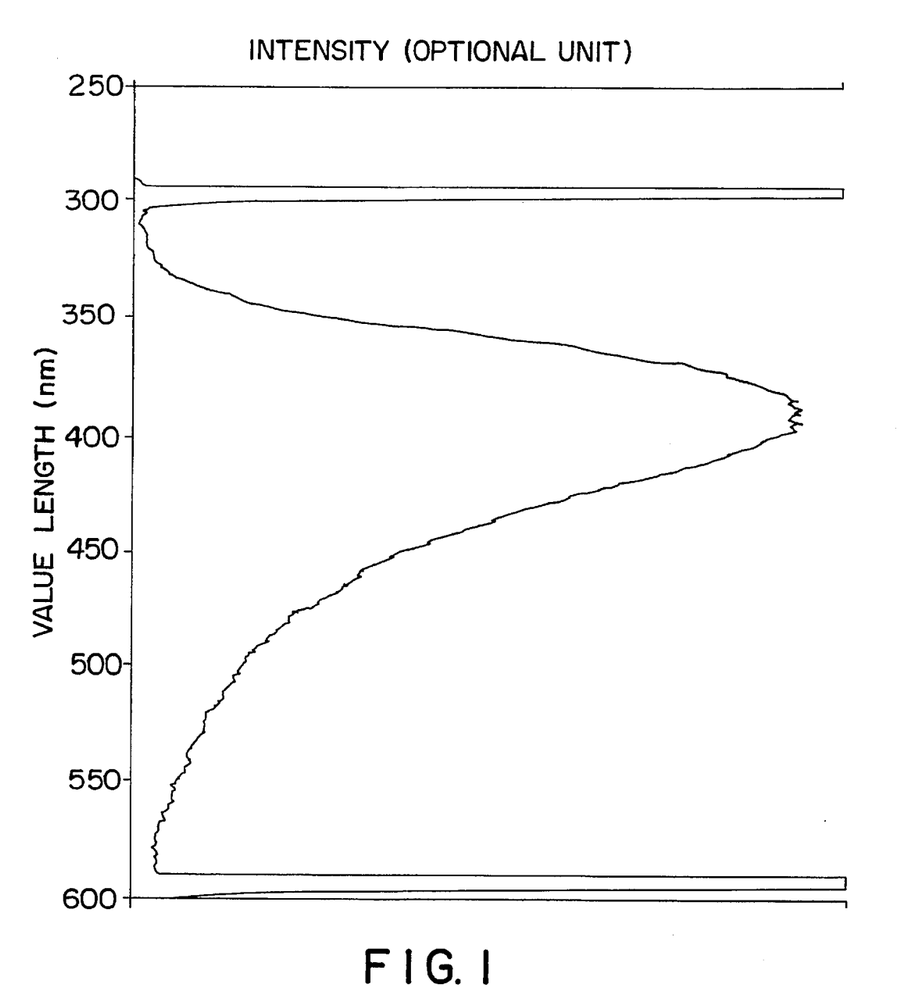
FIG. 1 shows a fluorescent spectrum of the copolymer obtained in Example 1.

Copolymerization of N-vinylcarbazole with a
Cumarin Derivative Monomer 3-(2'-Benzoxazolyl)-7-vinylcarbonylumbelliferone (25 mg) obtained in Preparation example 1 and N-vinylcarbazole (500 mg) were dissolved in benzene (20 ml), followed by sufficiently degassing, adding AIBN (10 mg), agitating the mixture at 60° to 70° C. for 5 hours, cooling dropwise adding the solution into a mixed solution of methanol (300 ml) with acetone (200 ml), filtering off deposited solids, dissolving them in THF (10 ml), again dropwise adding the solution into a mixed solution of methanol (300 ml) with acetone (200 ml), three times repeating this procedure, and drying the resulting solids under reduced pressure, to obtain a random copolymer (320 mg) of the present invention. According to elemental analysis of this copolymer, the content of cumarin derivative part was 5.0 mol % and the weight average molecular weight was 31,000. Further, this polymer emitted a blue-green color fluorescence by irradiation of ultraviolet rays. Its spectra are shown in FIG. 1.

EXAMPLE 2

Figure 2:
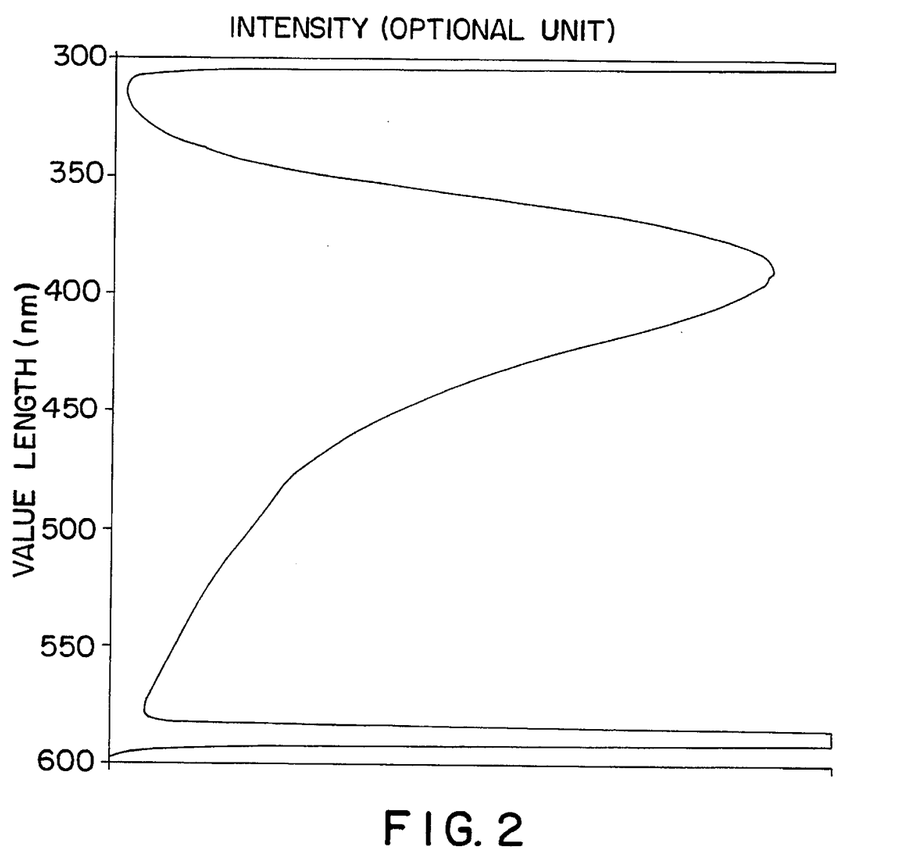
FIG. 2 shows a fluorescent spectrum of the copolymer obtained in Example 2.

Copolymerization of N-vinylcarbazole with a
Cumarin Derivative Monomer 3-(2'Benzoxazolyl)-7-vinylcarbonylumbelliferone (5 mg) obtained in Preparation example 1 and N-vinylcarbazole (500 mg) were dissolved in benzene (20 ml), followed by sufficiently degassing, adding AIBN (10 mg), agitating the mixture at 60° to 70° C. for 5 hours, cooling, dropwise adding the solution into a mixed solution of methanol (300 ml) with acetone (200 ml), filtering off the deposited solids, dissolving them in THF (10 ml), again dropwise adding the solution into a mixed solution of methanol (300 ml) with acetone (200 ml), three times repeating this procedure, and drying the resulting solids under reduced pressure, to obtain a random copolymer (390 mg) of the present invention. According to elemental analysis of this polymer, the content of cumarin derivative was 10.5 mol % and the weight average molecular weight was 28,000. This polymer emitted a blue-green color fluorescence by irradiation of ultraviolet rays. Its spectra are shown in FIG. 2.

EXAMPLE 3

Figure 3:
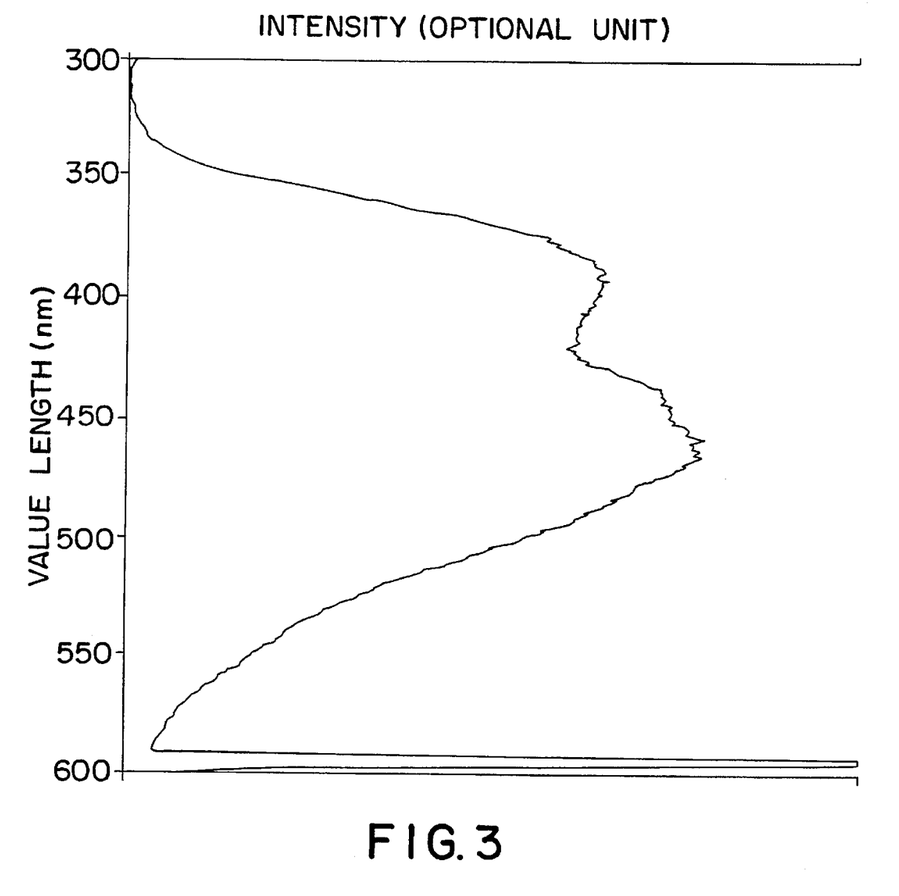
FIG. 3 shows a fluorescent spectrum of the copolymer obtained in Example 3.

Copolymerization of N-vinylcarbazole with a
Cumarin Derivative Monomer 3-(2'-Benzoxazolyl)-7-vinylcarbonylumbelliferone (10 ml) obtained in Preparation example 1 and N-vinylcarbazole (500 mg) were dissolved in benzene (20 ml), followed by sufficiently degassing, adding AIBN (10 mg), agitating the mixture at 60° to 70° C. for 5 hours, cooling, dropwise adding the solution into a mixed solution of methanol (300 ml) with acetone (200 ml), filtering off deposited solids, dissolving them in THF (10 ml), again dropwise the solution into a mixed solution of methanol (300 ml) with acetone (200 ml), three times repeating this procedure, and drying the resulting solids under reduced pressure, to obtain a random copolymer (390 mg). According to elemental analysis of the copolymer, the content of cumarin derivative was 3.6 mol % and the weight average molecular weight was 30,000. This polymer emitted a blue light fluorescence by irradiation of ultraviolet rays. The spectra are shown in FIG. 3.

EXAMPLE 4

Figure 4:
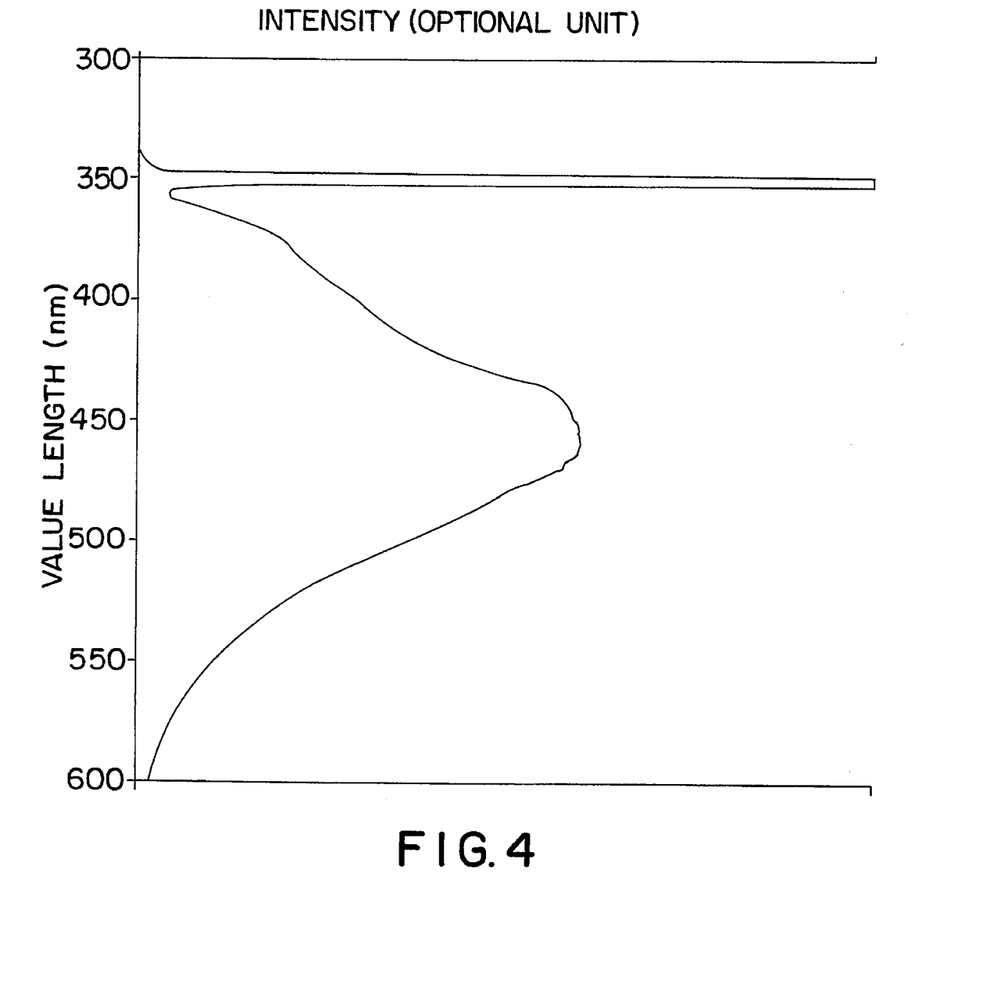
FIG. 4 shows a fluorescent spectrum of the copolymer obtained in Example 4.

Copolymerization of N-vinylcarbazole with Cumarin Derivative Monomer 3-(2'-Benzoxazolyl)-7-(2-vinylcarbonyloxyethyl)umbelliferone (15 mg) obtained in Preparation example 2 and N-vinylcarbazole (500 mg) were dissolved in benzene (20 ml), followed by sufficiently degassing, adding AIBN (10 mg), agitating the solution at 60° to 70° C. for 5 hours, cooling the solution, dropwise adding it into a mixed solution of methanol (300 ml) with acetone (200 ml), filtering off deposited solids, dissolving them in THF (10 ml), again dropwise adding the solution into a mixed solution of methanol (300 ml) with acetone (200 ml), three times repeating this procedure and drying the resulting solids under reduced pressure, to obtain a random copolymer of the present invention (390 mg). According to elemental analysis of this polymer, the content of cumarin derivative was 5.2 mol %, and the weight average molecular weight was 32,000. This polymer emitted a blue color fluorescence by irradiation of ultraviolet rays. The spectra are shown in FIG. 4.

EXAMPLE 5

ITO was made into a film of 5 nm thickness on a glass substrate of 25 mm×75 mm×1.1 mm according to deposition process (made by Tokyo Sanyo Vacuum Co., Ltd.), to obtain a transparent, supporting substrate. This transparent, supporting substrate was fixed onto a commercially available spinner (made by Kyoei Semiconductor Co., Ltd.), followed by spin-coating with a toluene solution of the copolymer (0.5 part by weight) obtained in Example 3, at 6,000 rpm, drying the substrate at 50° C. under a reduced pressure of $10^{-1}$ Pa to form a luminescent layer having a film thickness of 5 nm, fixing the substrate having the luminescent layer formed thereon, onto a substrate holder of a commercially available deposition device made by Shinkukiko Co., Ltd., installing an aluminum mask on the above luminescent layer, reducing the pressure of the vacuum layer down to $2\times10^{-4}$ Pa, depositing Mg from a graphitic crucible at a deposition speed of 1.2 to 2.4 nm/sec. and at the same time, depositing Ag from another crucible at a deposition speed of 0.1 to 0.2 nm/sec., to laminate-deposit an Mg—Ag mixed metal electrode on the luminescent layer in a thickness of 200 nm under the above conditions, and thereby obtain an opposite electrode for an element.

An element was prepared from ITO electrode as an anode and the Mg—Ag mixed metal electrode as a cathode. When a direct current voltage of 40 V was impressed upon the thus prepared element in air, a current of 100 mA/cm² flew, to obtain a uniform and stabilized, blue color surface luminescence of 300 cd/m².

EXAMPLE 6

After the luminescent layer of Example 5 was formed, a substrate was fixed onto a substrate holder of a deposition device, followed by reducing the pressure of the vacuum layer down to $2\times10^{-4}$ Pa, depositing 2-(4-biphenyl)-5-(4-butylphenyl)-1,3,4-oxadiazole as an electron-transporting layer from a siliceous crucible in a thickness of 50 nm, and at a deposition speed of 0.1 to 0.2 nm/sec., thereafter depositing an Mg—Ag mixed metal electrode on the electron-transporting layer in a thickness of 200 nm, in the same manner as in Example 5, to prepare an element. When a direct current voltage of 35 V was impressed upon an element of ITO electrode as an anode and the mixed metal electrode as a cathode in air, a current of 100 mA/cm² flew, to obtain a uniform and stabilized blue color surface luminescence of 500 cd/m².

EXAMPLE 7

Using a toluene solution of the copolymer of Example 3 (0.3 part by weight) as a luminescent material and 2-(4-biphenyl)-5-(4-butylphenyl)-1,3,4-oxadiazole (0.3 part by weight) as an electron-transporting material, a luminescent layer having a film thickness of 50 nm was formed on a transparent supporting substrate, in the same manner as in Example 5. Thereafter, an Mg—Ag mixed metal electrode was deposited on the above luminescent layer in a thickness of 200 nm, in the same manner as in Example 5, to prepare an element. When a direct current voltage of 25 V was impressed upon an element prepared from ITO electrode as an anode and the mixed metal electrode as a cathode, in air, a current of 100 mA/cm² flew to obtain a uniform and stabilized blue color surface luminescence of 500 cd/m².

EXAMPLE 8

After a luminescent layer same as in Example 7 was formed, a substrate was fixed onto a substrate holder of a deposition device, followed by reducing the pressure of a vacuum layer down to $2\times10^{-4}$ Pa, depositing tris(8-hydroxyquinolino)aluminum as an electron-transporting layer from a siliceus crucible in a thickness of 50 nm at a deposition speed of 0.1 to 0.2 nm/sec., thereafter depositing an Mg—Ag mixed metal electrode on the electron-transporting layer in a thickness of 200 nm in the same manner as in Example 5, to prepare an element. When a direct current voltage of 15 V was impressed upon an element prepared from ITO electrode as an anode and the mixed metal electrode as a cathode, in air, a current of 100 mA/cm² flew, to obtain a uniform and stabilized blue color surface luminescence of 800 cd/m².

COMPARATIVE EXAMPLE 1

Using a toluene solution of poly(3-(2'-benzoxazolyl)-7-(2-vinylcarbonyloxyethyl)umbelliferone (0.015 part by weight) as a luminescent material and poly(N-vinylcarbazole) (0.5 part by weight) as an electron-transporting material, a luminescent layer was formed on a transparent supporting substrate, in the same manner as in Example 5. The resulting film thickness was 50 nm. Thereafter, an Mg—Ag mixed metal electrode was deposited on the luminescent layer in a thickness of 200 nm, in the same manner as in Example 5, to prepare an element. When a direct current voltage of 41 V was impressed on an element prepared from

ITO electrode as an anode and the mixed metal electrode as a cathode, in air, a current of 100 mA/cm² flew, to obtain a blue color surface luminescence of 250 cd/m², but this color was provided with lights and shades, and the translucence became damped just after the impression of the voltage.

EFFECTIVENESS OF THE INVENTION

The copolymer of the present invention has superior film-forming properties and also a superior adhesion onto a substrate; hence it is possible to form a good coating film without using any adhesive. Further, the copolymer is at the same time in one molecule provided with a cumarin derivative having a high fluorescent intensity and an N-vinylcarbazole part having superior electron-transporting properties; hence as to the EL element containing the copolymer film of the present invention, movement of electric charge occurs with a good efficiency and it is possible to obtain a stabilized surface luminescence. Further, since it is possible for the copolymer of the present invention to effect luminescence over the whole visible region, its use makes it possible to produce a luminescent element having a high efficiency, such as full color display, etc.

What we claim is:

1. A copolymer consisting of repetition units expressed by the formula (1) and repetition units expressed by the formula (2), the content of the repetition units (1) in the total repetition units being 0.01 to 50% by mol, and the weight average molecular weight calculated in terms of polystyrene measured according to gel permeation chromatography being 1,000 to 1,000,000:

in the formula (1), $R_1$ to $R_5$ each independently being chosen from the group consisting of hydrogen, fluorine, alkyl group, alkoxy group, dialkylamino group, alkanoyloxy group, alkyloxycarbonyl group, aryl group, cyano group, alkanoyl group or trifluoromethyl group; X representing O or NY (wherein Y represents hydrogen, alkyl group or aryl group); n representing 1 or 2; and $R_6$ representing hydrogen or methyl group.

2. A copolymer according to claim 1, wherein said repetition units of the formula (1) and the formula (2) are arranged randomly.

* * * * *